United States Patent [19]

Skaggs et al.

[11] Patent Number: 5,133,591
[45] Date of Patent: Jul. 28, 1992

[54] BLOW-MOLDED PLASTIC WHEEL AND METHOD FOR MANUFACTURING SAME

[75] Inventors: Marvin Skaggs, St. Louis; James D. Voelkel, St. Charles, both of Mo.

[73] Assignee: Semco Plastic Company, Inc., St. Louis, Mo.

[21] Appl. No.: 707,690

[22] Filed: May 30, 1991

[51] Int. Cl.$^5$ .................................. B60B 5/02
[52] U.S. Cl. ...................... 301/63 PW; 301/63 DD
[58] Field of Search ....... 301/63 PW, 63 DD, 63 DS, 301/65, 105 R; 152/323, 324, 325, 326

[56] References Cited

U.S. PATENT DOCUMENTS

| | | | |
|---|---|---|---|
| Re. 30,030 | 6/1979 | Coran et al. | 301/63 PWX |
| 3,062,254 | 11/1962 | Keefe | 152/7 |
| 3,666,322 | 5/1972 | Pickron | 301/63 PW |
| 3,802,823 | 4/1974 | Doughty et al. | 425/326 |
| 3,807,474 | 4/1974 | Wendt et al. | 152/324 |
| 3,843,202 | 10/1974 | Lacerte | 301/63 |
| 3,919,374 | 11/1975 | Komendowski | 264/90 |
| 3,952,786 | 4/1976 | Kreling et al. | 152/323 |
| 4,000,926 | 1/1977 | Wilcox | 301/63 DD |
| 4,031,937 | 6/1977 | Georgia et al. | 152/9 |
| 4,040,670 | 8/1977 | Williams | 301/5.3 |
| 4,095,846 | 6/1978 | Agins | 301/37 |
| 4,200,326 | 4/1980 | Wilcox | 301/124 RX |
| 4,217,944 | 8/1980 | Pascal | 152/323 |
| 4,252,378 | 2/1981 | DeBolt et al. | 301/63 PWX |
| 4,471,999 | 9/1984 | Browne | 301/63 PW |
| 4,535,827 | 8/1985 | Seaford | 301/63 PWX |
| 4,592,595 | 6/1986 | Freeman | 301/63 |
| 4,664,958 | 5/1987 | Jones | 428/36 |
| 4,674,759 | 6/1987 | Parker | 280/47.26 |
| 4,879,794 | 11/1989 | Djerf | 29/159.1 |
| 4,911,878 | 3/1990 | Hopperdietzel | 264/516 |
| 5,000,904 | 3/1991 | Schiemann | 264/515 |

OTHER PUBLICATIONS

Monsanto Advertising brochure for Santoprene dated 1988.
Monsanto Document entitled "Extrusion Blow Molding Process of Santoprene" dated Mar. 1, 1988.

*Primary Examiner*—Russell D. Stormer
*Attorney, Agent, or Firm*—Herzog, Crebs & McGhee

[57] ABSTRACT

The Improved Wheel is suitable for use on lawn mowers, trash containers, toy wagons and other similar devices. The Improved Wheel is formed in a two step manufacturing process. In the first step, a quantity of hubs are injection molded from a thermoplastic or a thermoset plastic. Two opposing interlocking hubs are used in the manufacture of each wheel. The hubs provide additional strength and improved wear characteristics to the wheel. In the second manufacturing step, a pair of opposing interlocking hubs are placed in the open mold of a conventional blow molding machine. The parison, which is preferably an elastomer, is then extruded between the two open halves of the mold. The two halves of the mold close and capture the parison between the two interlocking hubs in the mold cavity forming a web which radiates from the central bore of the hubs. The remainder of the parison is inflated to form a tube around the exterior of the hubs.

16 Claims, 3 Drawing Sheets

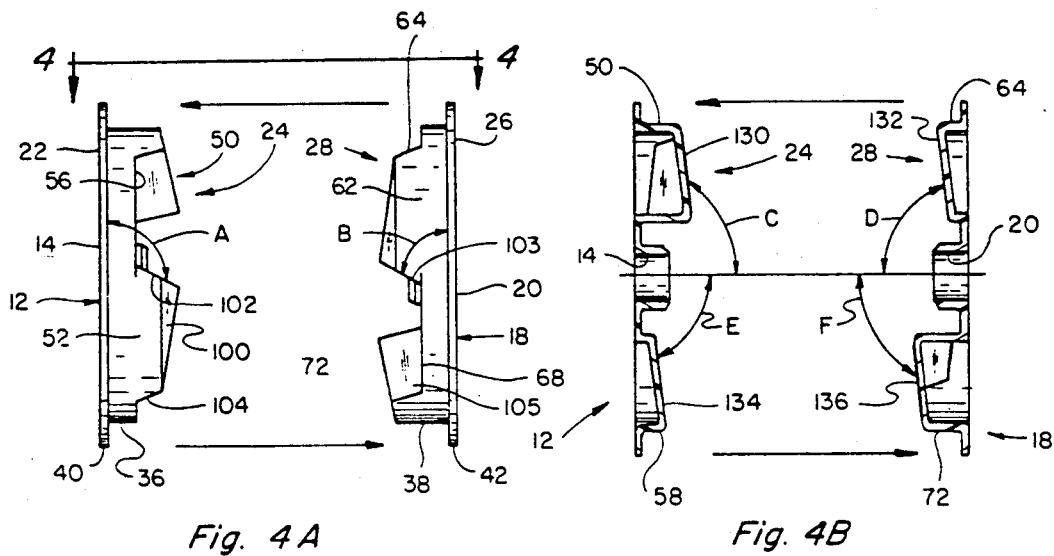
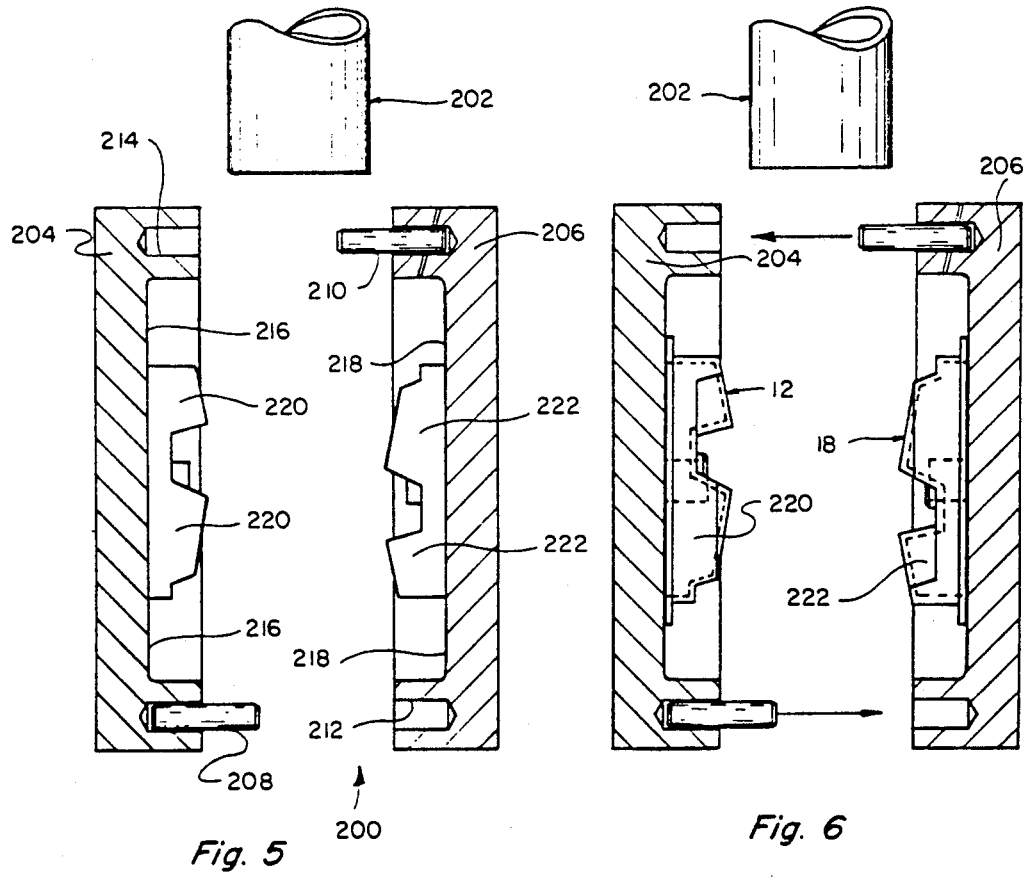

BLOW-MOLDED PLASTIC WHEEL AND METHOD FOR MANUFACTURING SAME

BACKGROUND OF INVENTION

1. Field of the Invention

The Improved Wheel can be used in various applications, including but not limited to trash containers, lawn mowers, toy wagons, and the like. The Improved Wheel is a semi-pneumatic design and is manufactured using a two step process. In the first step, disc-shaped interlocking hubs are produced using conventional injection molding techniques from a thermoplastic, such as, but not limited to, high density polyethylene (HDPE) or a thermoset plastic such as polyphenaline sulfide (PPS). In the second step, a pair of the aforementioned disc-shaped interlocking hubs are inserted in opposing positions of the open mold in a conventional blow molding machine which then produces the Improved Wheel. The tube and web of the Improved Wheel are preferably formed from an elastomer such as Santoprene ® thermoplastic rubber; however, various thermoplastics may also be suitable.

2. Description of the Prior Art

The Assignee of the present invention, Semco Plastic Company, Inc., manufactures a variety of products using conventional injection molding and blow molding techniques. Semco manufactures a number of wheels which are blow molded from HDPE. These wheels will not support a significant load nor or they intended for applications that will see a substantial amount of travel. The most common application for these blow molded HDPE wheels is for outdoor grills.

Semco and others in the industry use various types of inserts in connection with blow molding of these HDPE wheels. The most common type of insert is a circular white ring which is used to create a white sidewall in the black wheel. This technique uses a two step manufacturing process. In the first step, the white ring is injection molded from HDPE. In the second step, the white ring is manually inserted inside one half of the open mold of a conventional blow molding machine. The parison is then extruded between the open halves of the mold in the conventional blow molding machine. When the two halves of the mold close and capture the parison, the white sidewall sticks to the hot parison and forms an integral part of the black wheel. This white sidewall insert is strictly ornamental and does not enhance the strength of the HDPE wheel.

Use of various other inserts in blow molding is known to those skilled in the art. U.S. Pat. No. 4,664,958 entitled "Hollow Plastic Container Having An Insert" discloses an insert which is used in connection with blow molding of large drums. The insert, which is a threaded bung, could be plastic or metal. U.S. Pat. No. 3,919,374 entitled "Method For Blow Molding A Container Having An Auxiliary Component Formed As An Integral Part Of It" likewise teaches use of an insert in connection with the manufacture of a container. The insert which is identified as a plug is placed into the cavity of an open mold prior to extrusion of the parison.

Other inserts have been used in various blow molding processes. See for example: U.S. Pat. No. 4,991,878 entitled "Method For Producing A Blow-Molded Body"; U.S. Pat. No. 5,000,904 entitled "Device And Process For Production Of A Blown Three-Handled Container"; U.S. Pat. No. 4,674,759 entitled "Trash Container Wheel Structure"; U.S. Pat. No. 4,031,937 entitled "Unitary Tire-Wheel" and U.S. Pat. No. 3,062,254 entitled "Molded Wheel Having Internal Reinforcing."

The general use of inserts is also known in the field of injection molding. U.S. Pat. No. 4,040,670, entitled "Method Of Molding A Skate Wheel Having A Polyester Core And A Polyurethane Case And The Product Thereof" teaches the use of a rigid core which is surrounded by a clear wear resistant wheel casing.

There are several other patents dealing with solid core and semi-pneumatic type wheels which address some of the common interlocking problems associated with wheels of this type. These various patents are listed in the Information Disclosure Statement filed concurrently herewith.

The present invention includes opposing interlocking hubs which capture and adhere to the parison during the blow molding process. The Improved Wheel has and wear characteristics when compared with conventional HDPE wheels. Because of the economics of blow molding, the Improved Wheel is more economical to manufacture than conventional solid core wheels.

SUMMARY OF THE INVENTION

The present invention includes both an apparatus, i.e., the Improved Wheel, and the method for manufacturing same. The manufacturing process involves a two step operation. In the first step, a predetermined quantity of disc-shaped interlocking hubs are manufactured using conventional injection molding techniques from a thermoplastic such as, but not limited to HDPE or from a thermoset plastic such as but not limited to PPS. In the second step, a pair of these disc-shaped interlocking hubs are placed in opposing positions in each half of the open mold in a conventional blow molding machine. After the parison has dropped between the two halves of the mold, they close and capture the parison between the two hubs forming a web which radiates from the central bore in the hubs. The parison, which forms the tube and web of the wheel is then inflated using conventional blow molding techniques. The parison is preferably formed from an elastomer such as, but not limited to Santoprene ® thermoplastic rubber, a product of the Monsanto Company of St. Louis, Missouri. However, various thermoplastics may also be suitable for the parison.

The hot parison melts a portion of the interior face of the opposing interlocking hubs thus forming a very strong mechanical bond between the parison and the hubs. The hubs themselves have a plurality of protruding lugs which engage with corresponding recessed channels in the opposing hub to discourage separation of the tube and web from the hubs and to further strengthen the wheel.

Those skilled in the art will recognize that the Improved Wheel could also be manufactured with a central metal bushing and/or roller bearings which are within the scope of this invention.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is noted, however, that the appended drawings illustrate only typical embodiments of this invention and are therefore not to be considered limiting of its scope, for the invention may admit to other equally effective embodiments.

FIG. 4A is a side view of the two opposing disc-shaped interlocking hubs of FIG. 3.

FIG. 4B is a section view of the two interlocking hubs taken along the line 4—4 of FIG. 4A.

FIG. 5 is a section view of the open mold used in a conventional blow molding machine for manufacture of the Improved Wheel. The head which extrudes the parison is shown in perspective above the open mold.

FIG. 6 is a section view of the open mold of FIG. 5 with the addition of two opposing disc-shaped interlocking hubs which have been inserted in each half of the open mold.

DESCRIPTION OF THE PREFERRED EMBODIMENT

Figure 1:
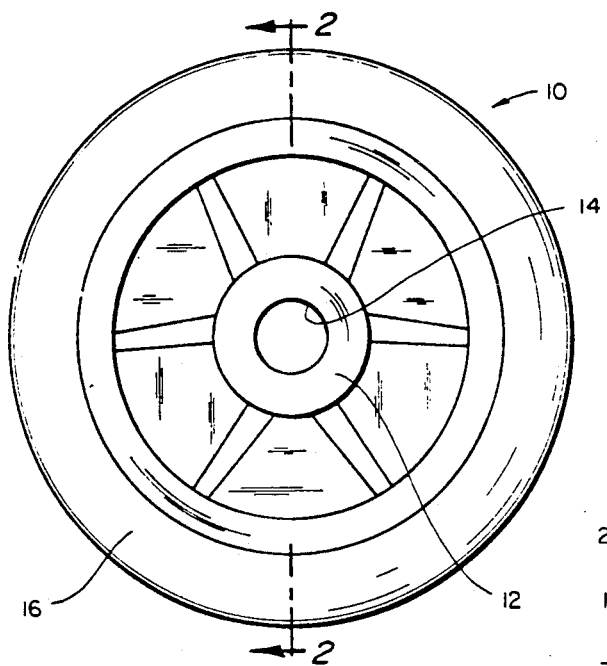
FIG. 1 is a side view of the Improved Wheel.

In FIG. 1, the Improved Wheel is generally identified by the numeral 10. An interlocking disc-shaped hub 12 is centrally positioned in the wheel 10. The hub 12 defines a central bore 14 which typically receives an axle. The central bore 14 can also receive a bushing or a conventional roller bearing. A tube 16 is formed around the outer circumference of the wheel 10.

Figure 2:
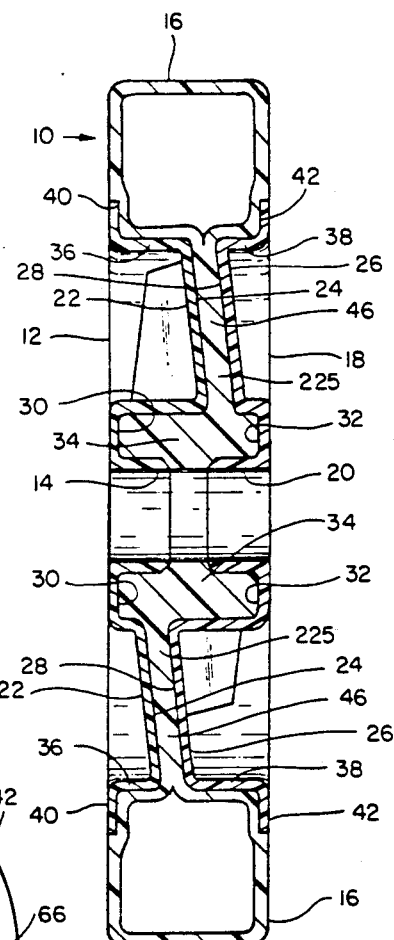
FIG. 2 is a section view of the Improved Wheel taken along line 2—2 of FIG. 1.

In FIG. 2, the wheel 10 is shown in section view taken along the line 2—2 of FIG. 1. The disc-shaped interlocking hub 12 is positioned on the left side of the wheel 10. An opposing disc-shaped interlocking hub 18 is positioned on the opposite side of the wheel 10. The central bore 14 of the hub 12 is aligned with an opposing central bore 20 in the hub 18.

The hub 12 has an exterior face 22 and an interior face 24. Likewise the hub 18 has an exterior face 26 and interior face 28. The interior faces 24 and 28 contact the parison 225.

A recess or cavity 30 is formed in the interior face 24 of the hub 12. An opposing recess or cavity 32 is formed in the interior face 28 of the hub 18. The recesses 30 and 32 surround the central bores 14 and 20. The recesses 30 and 32 contact and capture a reinforcing portion 34 of the parison 225 to strengthen the wheel 10. A web 46 radiates from the central bores 14 and 20 and the cavities 30 and 32 and is captured between the hub 12 and the hub 18.

The hub 12 forms a shoulder or rim 36 about its outer circumference. The hub 18 forms an opposing shoulder or rim 38 about its outer circumference. Extending from the rim 38 is sidewall 40. Extending from the rim 38 is an opposing sidewall 42. The rims 36 and 38 and the sidewalls 40 and 42 contact and support a portion of the tube 16 which is also formed from the parison 225. The tube 16, the web 46 and the reinforcing portion 34 are all formed from the parison 225. As shown in the drawing, the hub 12 and the hub 18 do not actually touch each other; rather, the parison 225 separates the opposing hubs 12 and 18. However, in alternative embodiments it would be possible to design a pair of opposing hubs which actually contact each other at one or more selected locations.

Figure 3:
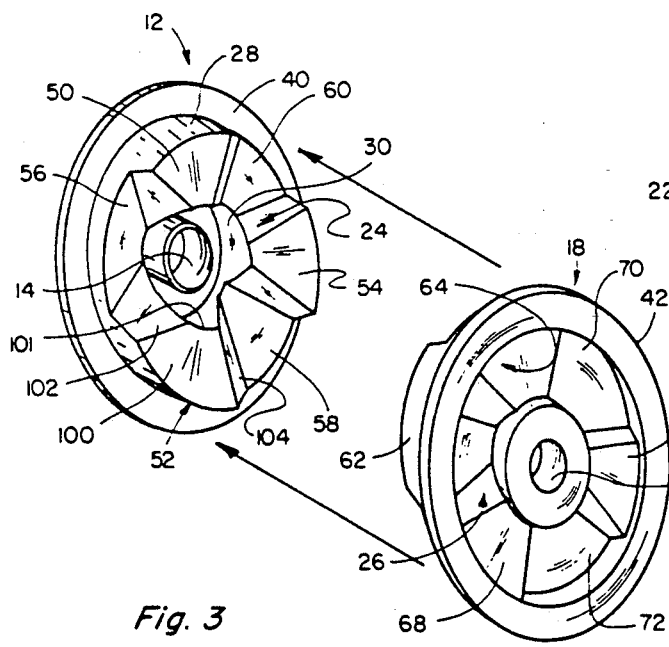
FIG. 3 is a perspective view of two opposing disc-shaped interlocking hubs.

In FIG. 3, hub 12 and opposing hub 18 are shown in a perspective view, the arrows indicating how they interlock together. With regards to hub 12, the interior face 24 is seen in the drawing. With regards to hub 18, the exterior face 26 is seen in the drawing. Protruding from the interior face 24 of hub 12 is a first locking lug 50, second locking lug 52, and a third locking lug 54. A first recessed channel 56, a second recessed channel 58, and a third recessed channel 60 are formed in the interior face 24 of the hub 12.

In a clockwise direction, the lugs 50, 54 and 52 are separated by the recessed channels 60, 58 and 56, and arranged as follows: lug 50, channel 60, lug 54, channel 58, lug 52 and channel 56.

When the hubs 12 and 18 are engaged in the completed wheel 10, the lug and channel arrangement is as follows: lug 50 protruding from hub 12 and engages recessed channel 64 in hub 18; lug 70 protruding from hub 18 engages the recessed channel 60 in the hub 12; the lug 54 protrudes from the hub 12 and engages the recessed channel 66 in the hub 18; lug 72 protrudes from the hub 18 and engages the recessed channel 58 in the hub 12; lug 52 protrudes from the hub 12 and engages the recessed channel 68 in the hub 18; and lug 62 protrudes from the hub 18 and engages the recessed channel 56 in the hub 12.

As will be recognized by those skilled in the art, additional locking lugs could be added to this design and still fall within the scope of the invention. Likewise, fewer locking lugs could be utilized and still fall within the scope of this invention. The locking lugs are generally pie shaped; however, those skilled in the art will recognize that other interlocking shapes would also fall within the scope of this invention.

FIG. 4A is a side view of the opposing interlocking hubs 12 and 18 previous shown in FIG. 3. The arrows show how the hubs fit together. The interior faces 24 and 28 of the two hubs do not actually touch each other as better shown in FIG. 2. The interior faces 24 and 28 of the hubs are actually separated by the parison 225. However, an alternative design in which the hubs actually contact each other in various locations would also be within the scope of this invention.

The rim 36, completely encircles the hub 14. The sidewall 40 radiates about the rim 36 and is perpendicular thereto. The rim 38 completely encircles the hub 18. The sidewall 42 radiates from the rim 38 and is perpendicular thereto. Locking lug 50 protrudes from hub 12 and engages the recessed channel 64 in the hub 18. Locking lug 62 protrudes from the hub 18 and engages the recessed channel 56 formed in the hub 12. Locking lug 52 protrudes from the hub 12 and engages the recessed channel 68 formed in the hub 18. Locking lug 72 protrudes from the hub 18 and engages the recessed channel 58 in hub 12.

Each locking lug is generally pie shaped. It could also be described as a truncated four sided pyramid. With regards to locking lug 52, the top 100 is partially surrounded by two opposing walls 102 and 104. The locking lug 52 is further surrounded by the sidewall 36 and the interior wall 101 which is a portion of the recess 30. Moving clockwise around the locking lug 52, the perimeter is defined by the sidewall 36, the wall 102, the interior wall 101, which is a part of the recess 30, and the opposing wall 104. Those skilled in the art will recognize that the shape of the locking lug is not limited to a truncated pyramid. Other shapes fall within the scope of this invention, as long as there is some protrusion from the interior surface 24 of the hub 12 and a corresponding recess in the opposing hub 18 or vice a versa.

The particular angles of the truncated pyramid will be described so that a full and complete disclosure is made of this invention; however, those skilled in the art will recognize that other angles also fall within the scope of this invention. The angle of the wall 102 of the locking lug 52 and the angle of the wall 103 of the opposing lug 62 in hub 18 are supplementary. The angle of the wall 102 as shown by the arc A is approximately 135° as measured from the axis of the sidewall 40. The angle of the wall 103 is approximately 45° as measured from the axis of the sidewall 42. Angle A and angle B when added together equal 180° and are therefore supplementary. This supplementary relationship is repeated in each pair of opposing walls between the lugs as shown in the drawings. This supplementary relationship between the walls of the locking lugs further tends to mechanically strengthen the wheel.

In FIG. 4B, the hubs 12 and 18 are shown in section view along the line 4—4 of FIG. 4A. Locking lug 50 protrudes from the interior surface 24 of hub 12 and engages the recessed channel 64 formed in the interior surface 24 of the hub 18. The top 130 of the locking lug 50 is positioned opposite the bottom 132 in the recessed channel 64. The top 130 and the bottom 132 form supplementary angles when measured from the axis of the center bore 14 and 20. For example, the top 130 is formed on a 110° angle from the axis of the center bores as shown by the Arc C. The angle of the bottom 132 is supplementary to the top 130 and is approximately 70° as shown by the Arc D. Likewise, the top 136 of the lug 72 is formed on an angle which is supplementary to the angle of the bottom 134 in the recessed channel 58. For example, the angle of the top 136 is approximately 110° when measured from the axis of the center bore as shown by the Arc F. The angle of the bottom 134 is approximately 70° when measured from the axis of the center bore as shown by the Arc E. Those skilled in the art will recognize that other angular relationships can be used to produce a strong wheel 10.

Method for Forming the Improved Wheel

Those skilled in the art recognize that there are at least three common techniques used for molding plastics as follows: injection molding, roto-molding, and blow molding. The present invention is manufactured in a two step process involving injection molding and blow molding.

In the first step, the interlocking hubs are manufactured using conventional injection molding techniques. A variety of thermoplastics are suitable for manufacture of the hubs; however, Applicants have found that HDPA is particularly suitable for this use. Various thermoset plastics may also be suitable for the hubs. When two hubs are placed opposite one another, they are designed to capture and interlock about the parison 225 as described more fully hereinafter. The hubs 12 and 18 themselves do not actually touch each other. The protruding locking lugs are designed to nestle into opposing recessed channels.

In the second step, a blow molding machine is used to complete the Improved Wheel. Those skilled in the art will recognize that there are at least six different types of blow molding machines in general use as follows: 1) continuous extrusion, 2) co-extrusion, 3) extrusion with an accumulator, 4) injection blow molding, 5) reciprocating screw, and 6) stretch blow molding. In the practice of this method, Applicants have found that blow molding machines which use extrusion with an accumulator are best suited; however, other types of blow molding machines may be useful in the practice of this method.

In FIG. 5, a mold 200 is shown in the open position. The extrusion head 202 is positioned above and between the open mold 200. The left half 204 of the mold 200 is positioned on one side of the extrusion head 202. The right half 206 of the mold 200 is positioned on the other side of the extrusion head 202. The mold 200 is manufactured out of aluminum which is cheaper and easier to machine than the steel molds used in injection molding procedures. Those familiar with the art will recognize an alignment pin 208 positioned in the bottom of the left half 204 of the mold 200 and another alignment pin 210 positioned in the right half 206 of the mold 200. A receiver 212 is formed in the right half 206 of the mold 200 and is sized and positioned to receive and engage the alignment pin 208. Likewise, a receiver 214 is formed in the left half 204 of the mold 200 and is positioned and sized to receive the alignment pin 210. The purpose of the aligning pins 208 and 210 and the receivers 212 and 214 is to make sure that the left half 204 and the right half 206 of the mold 200 align properly when closed during the manufacturing process. A cavity 216 is formed in the left half 204 of the mold 200 to mold a portion of the tube 16 of the Improved Wheel 10. Likewise, a cavity 218 is formed in the right half 206 of the mold 200 to mold a portion of the tube 16 of the Improved Wheel 10.

A protrusion 220 is formed in the cavity 216. The protrusion is sized and arranged to receive and support the hub 12 in the center of the cavity 216. Likewise, a protrusion 222 is formed in the cavity 218 and is sized and arranged to receive and support the hub 18 in the center of the cavity 218 during the manufacturing process.

In FIG. 6, the hub 12 has been placed on the protrusion 220, shown in phantom, either manually or robotically. Likewise, the opposing hub 18 has been placed on the protrusion 222, shown in phantom, either manually or robotically. The arrows show the direction of travel of the left half 204 and the right half 206 of the mold 200 during the closing process.

Figures 7, 8:
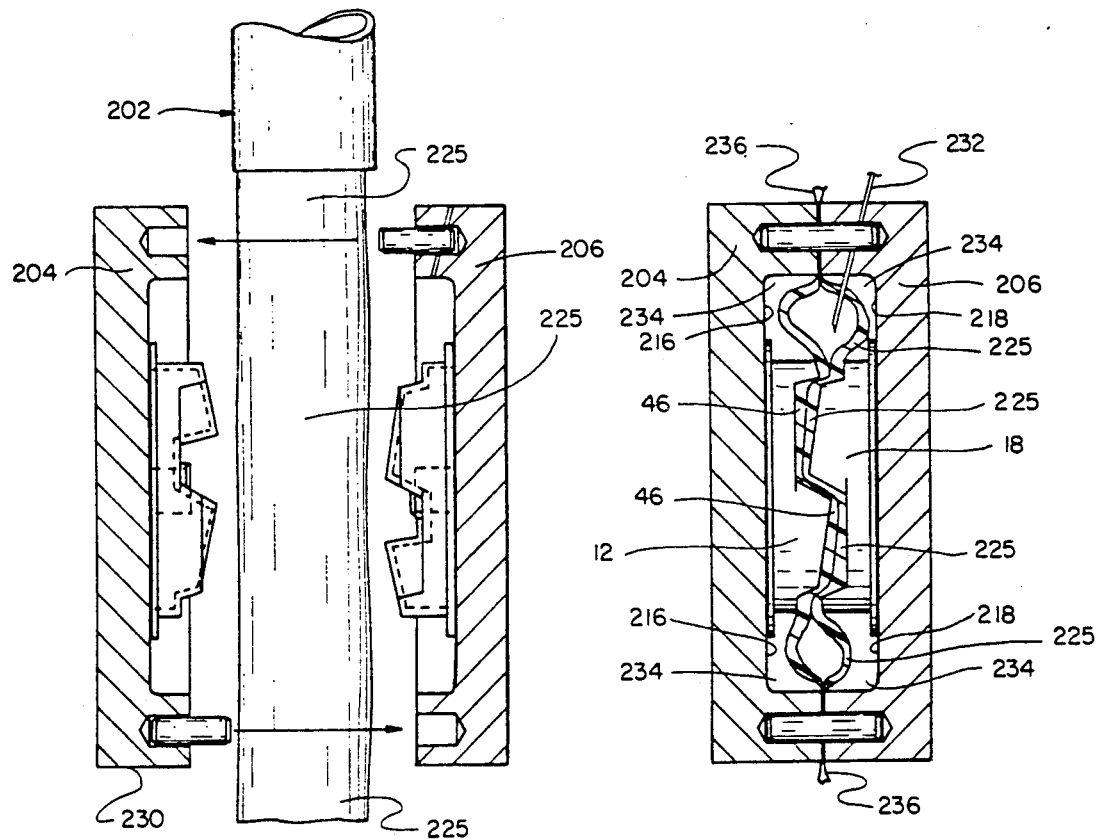
FIG. 7 is the same open mold shown in FIGS. 5 and 6 with the interlocking hubs placed in position in each half of the open mold. The parison has been extruded from the head and is hanging between the open halves of the mold.
FIG. 8 is a section view of the mold after it has been the closed and the parison has been captured between the two opposing hubs. A needle has penetrated the parison; however, the parison has not yet been inflated in this view.

In FIG. 7, the parison 225 has been extruded from the head 202 and has dropped between the left half 204 and the right half 206 of the mold 200. The parison 225 is hot and can be on the order of 400° F. Applicants recommend that the parison 225 be formed from an elastomer and have found that Santoprene ®, thermoplastic rubber, a Monsanto product, is particularly useful for this purpose. Other elastomers and thermoplastics may also be suitable and fall within the scope of this invention. The parison 225 is extruded to a point well below the bottom 230 of the left half 204 of the mold 200. Once the parison 225 extends beyond the bottom 230 of the mold 200, the left half 204 and the right half 206 automatically close.

In FIG. 8, the left half 204 and the right half 206 of the mold 200 are shown in the closed position. The parison 225 is captured between the hub 12 and the hub 18. An inflation needle 232 penetrates the parison 225. After the two halves of the mold 200 are securely closed, compressed air is injected through the inflation needle 232 which causes the parson 225 to expand and conform to the shape of the interior cavity 216 of the left half 204 of the mold 200 and the interior cavity 218 of the right half of the mold 208, thus forming the tube 16 in its final shape. Those skilled in the art will recognize that the mold 200 has a plurality of vents in the cavities 216 and 218 which allow the entrapped air in the void 234 to vent to atmosphere. For simplicity, those vents have been omitted form the drawing. As shown in this FIGURE, the hub 12 and the hub 18 do not actually contact each other. The parison 225 is trapped between these two hubs forming the web 46.

After the parison 225 has been fully expanded to conform with the interior cavities 216 and 218, the injection needle 232 is withdrawn. The mold 200 is then opened and the Improved Wheel, plus flashing 236, is ejected from the mold 200.

Figure 9:
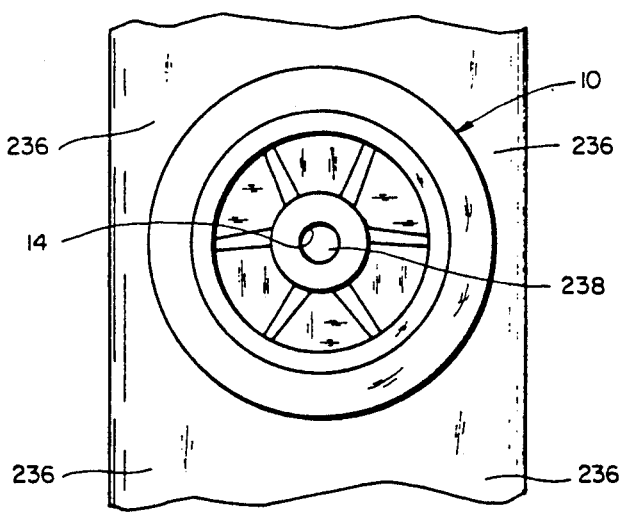
FIG. 9 shows the Improved Wheel with flashing after it has been taken out of the mold.

FIG. 9, is a drawing of the Improved Wheel 10 and the flashing 236 immediately after it has been ejected from the mold 200. The flashing 236 and the Improved Wheel 10 customarily will be placed in a jig to facilitate removal of the flashing 236. Typically, there will also be a plug 238 in the bore 14. This plug also needs to be removed prior to shipment of the Improved Wheel 10.

While the foregoing is directed to the preferred embodiment of the present invention, other and further embodiments of the invention may be devised without departing from the basic scope thereof, and the scope thereof is determined by the claims which follow.

We claim:

1. A wheel manufactured in part by conventional blow molding techniques in which a parison is extruded between two opposing halves of an open mold, comprising:
   a. first and second opposing disc-shaped interfitting hubs, each having an aligned central bore;
   b. a web formed from the parison and radiating from said central bore, said web captured between said first and second opposing disc-shaped interfitting hubs;
   c. said first hub having an interior and exterior face, said interior face formed into 1) a plurality of protruding locking lugs, and 2) a plurality of recessed channels, said lugs and said channels contacting said web;
   d. said second hub having an interior and exterior face, said interior face formed into 1) a plurality of recessed channels sized and arranged to mate with said protruding lugs in said opposing first hub, and 2) a plurality of protruding locking lugs sized and arranged to mate with said channels in said opposing first hub, said lugs and said channels contacting said web; and
   e. a tube formed around the outer circumference of said web, said tube and said web being formed from the parison.

2. The wheel of claim 1 wherein:
   a. said first hub forms a shoulder and a sidewall about its outer circumference, said shoulder and said sidewall having an interior and an exterior face; and
   b. said second opposing hub forms an opposing shoulder and an opposing sidewall about its outer circumference, said opposing shoulder and said opposing sidewall having an interior and an exterior face; and
   c. said interior faces of said shoulders and said sidewalls contacting and supporting portions of said tube.

3. The wheel of claim 2 wherein:
   a. said first hub defines a recess in said interior face, said recess surrounding said central bore, and
   b. said second opposing hub defines an opposing recess in said interior face, said opposing recess surrounding said central bore, and
   c. said recesses contact and capture a portion of said parison to strengthen said wheel.

4. The wheel of claim 1 wherein said first and said second opposing disc-shaped interlocking hubs are formed from high density polyethylene (HDPE).

5. The wheel of claim 4 wherein said parison is formed from an elastomer.

6. The wheel of claim 5 wherein said elastomer is Santoprene ®.

7. A method for manufacturing an improved wheel comprising the following steps:
   a. injection molding a first interfitting hub;
   b. injection molding a second opposing interfitting hub;
   c. placing said first interfitting hub in one half of an open mold in a conventional blow molding machine;
   d. placing said second opposing interfitting hub in the opposite half of said open mold in a conventional blow molding machine;
   e. extruding a tubular parison between said halves of said open mold;
   f. closing said halves of said mold and capturing said parison between said first interfitting hub and said opposing interfitting hub;
   g. inflating said parison to create a circumferential tube about said first and said second interfitting hubs; and
   h. opening said mold and ejecting the improved wheel and flashing from said open mold.

8. The method of claim 7 wherein said first and said second opposing disc-shaped interfitting hubs are formed from high density polyethylene (HDPE).

9. The method of claim 8 wherein said parison is formed from an elastomer.

10. The method of claim 9 wherein said elastomer is Santoprene ®.

11. A wheel manufactured in part by conventional blow molding techniques in which a parison is extruded between two opposing halves of an open mold, comprising:
   a. a first circular injection molded disc having an interior and exterior face and a central bore surrounded by a recess, said bore aligned perpendicular to the axis of said disc;
   b. a second opposing circular injection molded disc having an interior and exterior face and a central bore surrounded by a recess, said bore of said first disc aligned with said bore of said second opposing disc;
   c. a web formed from the parison and captured between said first and said second opposing discs;

d. a tube formed around the outer circumference of said web, said tube and said web being formed from the parison;

e. a plurality of locking lugs extending from said interior face of said first disc and a plurality of recessed channels defined by the spaces between said lugs; and f. a plurality of opposing locking lugs extending from said interior face of said second opposing disc and a plurality of opposing recessed channels defined by the spaces between said opposing locking lugs, said locking lugs of said first disc engaging said opposing recessed channels in said second opposing disc and said opposing locking lugs of said second disengaging said recessed channels in said first disc to interlock said disc with said tube.

12. The wheel of claim 11 wherein said recesses retain a portion of said parison to strengthen said wheel.

13. The wheel of claim 12 further including a first rim formed generally on the outer circumference of said first disc and a second opposing rim formed generally on the outer circumference of said second opposing disc, said rims supporting said tube.

14. The wheel of claim 13 wherein said first and said second opposing disc-shaped interfitting hubs are formed from high density polyethylene (HDPE).

15. The wheel of claim 14 wherein said web and said tube are formed from an elastomer.

16. The wheel of claim 15 wherein said elastomer is Santoprene ®.

* * * * *